(12) United States Patent
Iyewarun

(10) Patent No.: US 9,185,970 B1
(45) Date of Patent: Nov. 17, 2015

(54) PORTABLE CUTTING TABLE AND ASSOCIATED METHOD

(76) Inventor: Abayomi Iyewarun, Raytown, MO (US)

( * ) Notice: Subject to any disclaimer, the term of this patent is extended or adjusted under 35 U.S.C. 154(b) by 0 days.

(21) Appl. No.: 13/463,391

(22) Filed: May 3, 2012

Related U.S. Application Data

(63) Continuation-in-part of application No. 12/381,826, filed on Mar. 17, 2009, now Pat. No. 8,191,881.

(60) Provisional application No. 61/069,616, filed on Mar. 17, 2008.

(51) Int. Cl.
  *B23Q 3/00* (2006.01)
  *A47B 3/08* (2006.01)

(52) U.S. Cl.
  CPC ........................... *A47B 3/08* (2013.01)

(58) Field of Classification Search
  USPC ............... 269/289 R, 291, 297, 298
  See application file for complete search history.

(56) References Cited

U.S. PATENT DOCUMENTS

| | | | |
|---|---|---|---|
| 3,897,738 A | 8/1975 | Minsky et al. | ................. 108/119 |
| 4,765,603 A | 8/1988 | Huppert | |
| 5,311,813 A | 5/1994 | Fairbanks | |
| 5,546,852 A | 8/1996 | Bidwell | |
| 5,860,367 A | 1/1999 | Riegel | |
| 6,206,445 B1 | 3/2001 | Brooks | |
| 6,722,644 B1 | 4/2004 | Prosser | ..................... 269/289 R |
| 7,128,001 B2 | 10/2006 | Tsai | |
| 7,284,549 B1 | 10/2007 | Eby et al. | ...................... 126/9 R |
| D569,694 S | 5/2008 | Bizzell | ........................... D7/698 |
| 7,849,789 B1 | 12/2010 | Whelan | ......................... 108/130 |

*Primary Examiner* — Lee D Wilson
*Assistant Examiner* — Shantese McDonald

(57) ABSTRACT

A portable cutting table including a free-standing frame capable of being transported between remote locations wherein the frame is biased between folded and unfolded positions, respectively. A cutting surface support platform is attached to a top of the frame and a cutting surface connected to the cutting surface support platform. The portable cutting table further includes a mechanism for selectively biasing the frame between the folded and unfolded positions while the cutting surface remains statically engaged with the cutting surface support platform. A plurality of knife-holding implements directly and fixedly mated to the frame in such a manner that the knife-holding implements are simultaneously articulated about a fulcrum axis and thereby automatically displaced between stored and exposed positions as the frame is biased between the folded and unfolded positions, respectively.

14 Claims, 8 Drawing Sheets

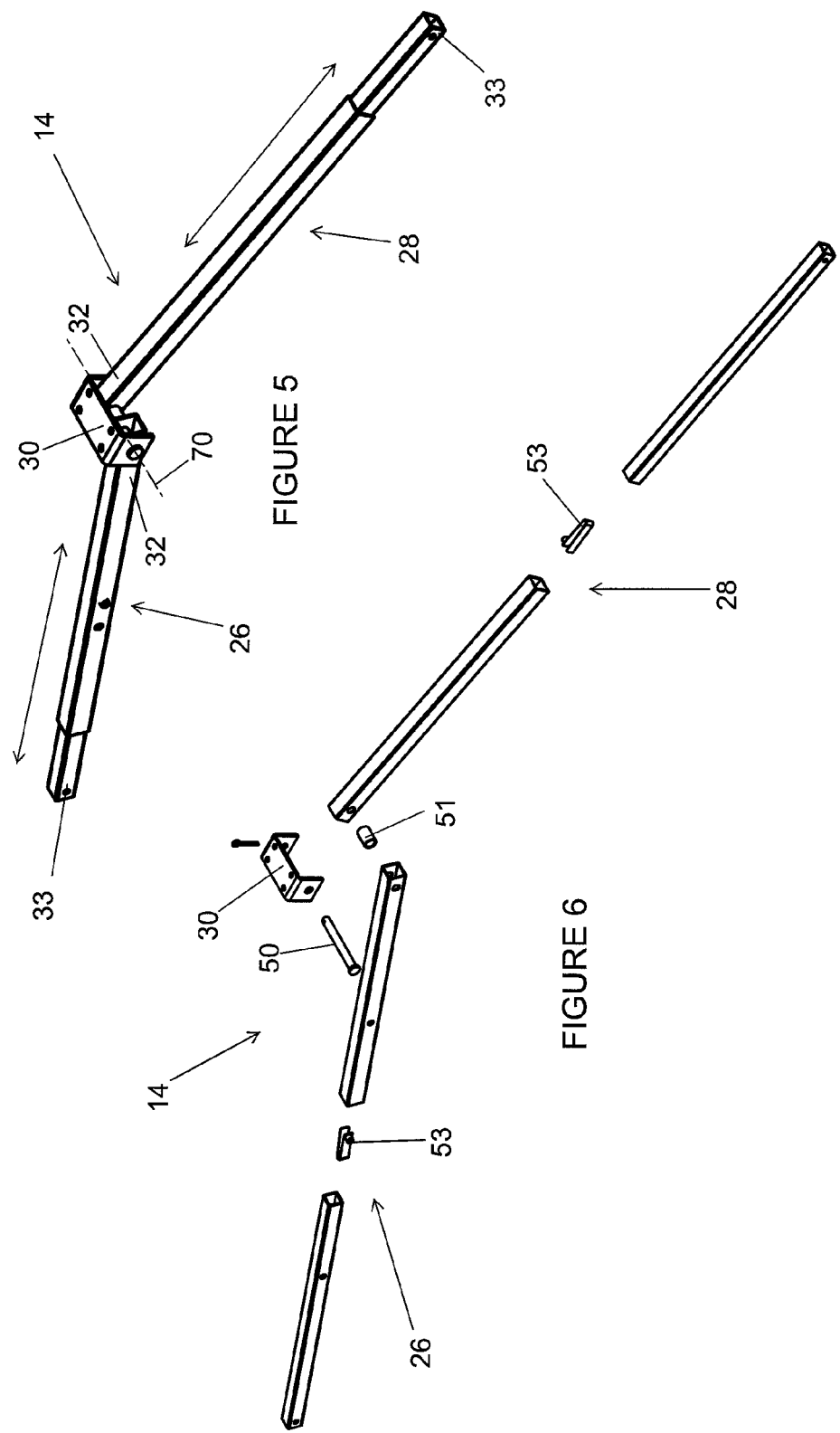

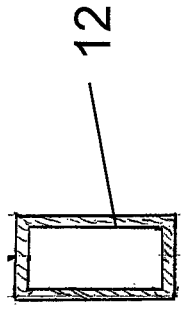
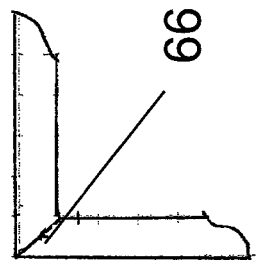
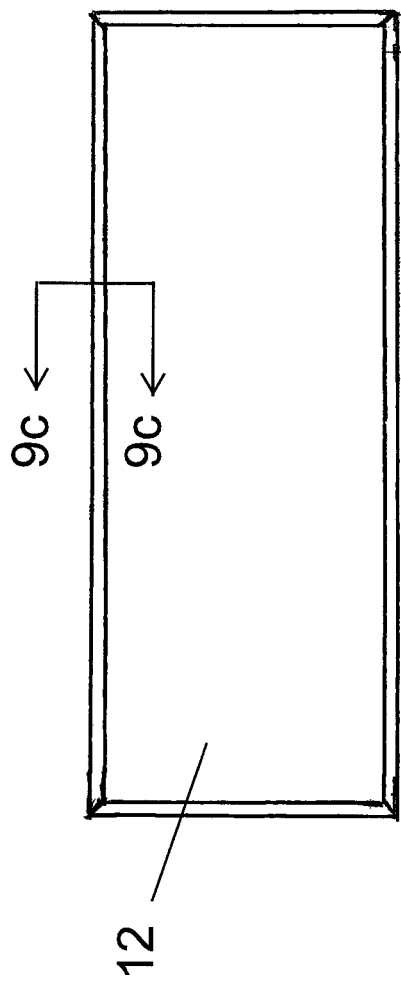
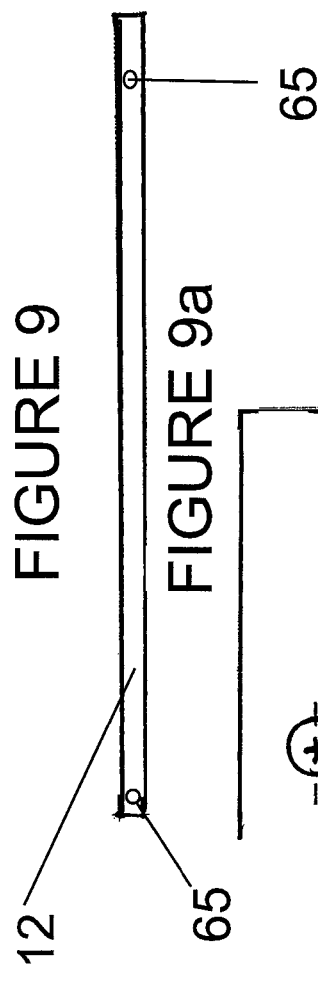
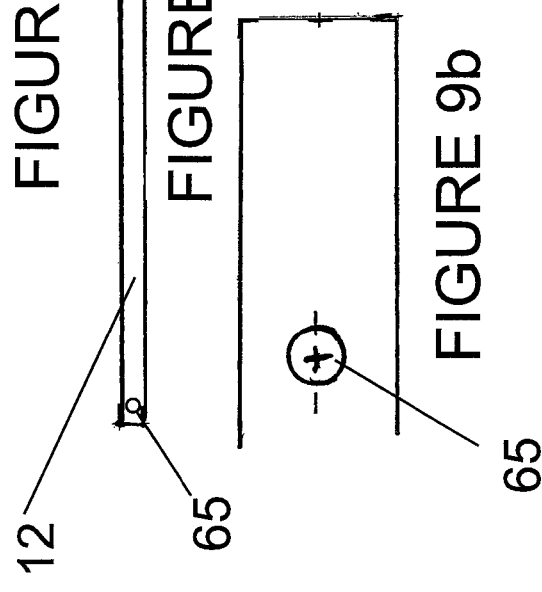

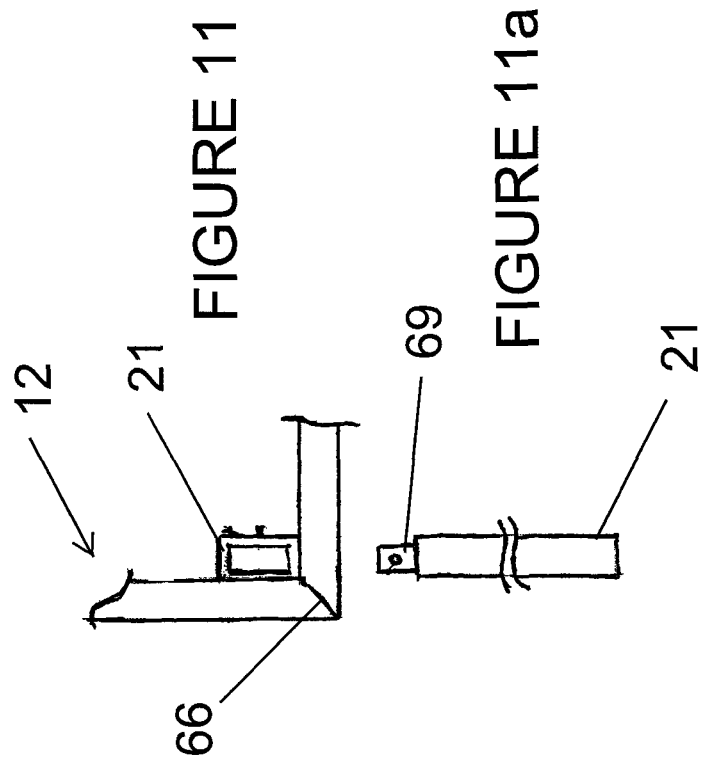

PORTABLE CUTTING TABLE AND ASSOCIATED METHOD

CROSS REFERENCE TO RELATED APPLICATIONS

This application is a continuation-in-part application of U.S. patent application Ser. No. 12/381,826, filed Mar. 17, 2009, currently pending, which claims the benefit of U.S. Provisional Application No. 61/069,616, filed Mar. 17, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE DISCLOSURE

1. Technical Field

This disclosure relates to cutting tables and, more particularly, to a portable cutting table including a support frame for holding a plurality of knife hooks and pivotal leg members for assisting in food preparation in a variety of locations.

2. Prior Art

Cutting tables have been in use for nearly as long as man has been civilized. The utility of a cutting table is derived from a need to cut various objects while simultaneously preserving the cutting edge of knives or blades. In the specific case of the culinary arts, the chef will also aspire to prepare foods in a clean and sanitary way. Directly cutting objects upon a hard support which resists damage from a knife is known to unduly dull the knife when the object is severed. Dulled cutlery requires additional force when severing work, and may lead to dangerous slipping and injury. Yet maintaining the cutlery in a sharp state requires substantial sharpening time, and, when the cutlery is repeatedly dulled by the work support, the repeated sharpening also leads to undesired wear of the cutlery.

However, cutting without suitable work surfaces will likely result in unrestrained movement of the cutting blade. This practice may lead to injury. Furthermore, without a suitable support, foods may be contaminated by unsterile surfaces. A similar issue arises with the use of a porous work support surface. The porous surface will trap food juices therein, potentially contaminating the work surface and harboring dangerous pathogens.

In a modern household, the cutting table will allow a person to prepare food quickly by slicing a diverse variety of foods, spices and other food ingredients without fear of permanently damaging either the work areas, typically counters and the like, or damaging the cutlery. With an appropriate cutting table, the cook may simply press hard enough to ensure that the food is completely sliced, without regard for what might occur with the knife after the food has been severed.

Outside of the kitchen, but still within a dwelling, there are many times when a person requires the use of a sharp blade such as a razor blade, Exacto-Knife or other tool for cutting various substrates. In these instances, the same concerns regarding the cutlery and work surfaces exist, where the working knife must, to perform the intended function, pierce through the material being cut. As a consequence, it is impossible for a person to stop short of cutting all the way through the substrate and still obtain the desired result. Consequently, there must be contact between the knife and the underlying work support. Where this work support is furniture or the like, the knife will cause harm and damage that may be irreparable.

In the outdoors or in areas less furnished, there may not be a ready work surface. In such instances, it is highly desired to provide a way to prepare food without risking contamination of the food with dirt, earth or the like. Similarly, the knife will also most desirably be protected from damage.

In the prior art, in order to achieve the important goals of protecting the knife while providing a severing surface, and to simultaneously avoid harboring dangerous pathogens, many cutting tables have been fabricated from wood. In particular, closed grain or minimally-grained woods tend to be preferred, such as maple, in the fabrication of cutting tables. This is because most wood species have very little damaging effect on the sharpness of a knife edge during engagement therewith, and closed-grain species provide a relatively non-porous and safe surface for working upon.

To prevent liquids from penetrating the wood and forming a hazardous surface, a food oil such as vegetable oil is commonly applied to the wood and permitted to soak into the pores or openings therein. As is known, the oil prevents water-based liquids from penetrating therein, while simultaneously providing a relatively mild, oiled surface against which the knife blade will be pressed. This oiled wood surface provides very minimal wearing of the knife blade or wooden surface, and yet may be readily cleaned or washed after use.

These traditional wooden cutting surfaces have been the standard used in kitchens for many years. However, the wooden surface requires proper cleaning and oiling to ensure safe usage over time. To have utility with different projects and types of work, the cutting table must be reasonably large to adequately support the various work. In a large kitchen area, this normally does not present a problem, since there is usually a space where the cutting table may either be supported on edge or otherwise stored. In fact, many modern kitchens include a pull-out cutting table immediately below the counter-top.

However, it will be apparent that the surface area of the cutting table and, relative to surface area, thinness of the table, does not lend the table to be readily transported, nor for storage in smaller spaces or places. Not only does the traditional thin and flat cutting table suffer from an inconvenient size, the table must either be manufactured excessively thick to have adequate strength to avoid breakage, or may instead be excessively heavy. Yet, there are many times where a person would benefit from the availability of the cutting table, for outdoor hunting activities or other activities outside of the user home.

Accordingly, the present disclosure is disclosed in order to overcome the above noted shortcomings. The portable cutting table is convenient and easy to use, portable yet durable in design, and designed for assisting in food preparation in a variety of locations. The apparatus is simple to use, inexpensive, and designed for many years of repeated use.

BRIEF SUMMARY OF THE DISCLOSURE

In view of the foregoing background, it is therefore an object of the present disclosure to provide an apparatus for a portable cutting table for supporting foodstuff during cutting operations. These and other objects, features, and advantages of the disclosure are provided by a portable cutting table including a free-standing frame capable of being transported between remote locations wherein the frame is biased between folded and unfolded positions, respectively. A cutting surface support platform is attached to a top of the frame and a cutting surface connected to the cutting surface support platform. The portable cutting table further includes a mechanism for selectively biasing the frame between the folded and unfolded positions while the cutting surface remains statically engaged with the cutting surface support platform. A plurality of knife-holding implements directly and fixedly mated to the frame in such a manner that the knife-holding implements are simultaneously articulated about a fulcrum axis and thereby automatically displaced between stored and exposed positions as the frame is biased between the folded and unfolded positions, respectively.

In a non-limiting exemplary embodiment, the cutting surface support platform is intercalated between the frame and the cutting surface.

In a non-limiting exemplary embodiment, the frame includes a plurality of rectilinear support arms attached to the cutting surface support platform and registered parallel to the cutting surface when the frame is at the folded and unfolded positions. A plurality of rectilinear support legs are also provided wherein each has top ends situated subjacent to the cutting surface support platform. In this manner, the top ends are coupled to corresponding ones of the support arms and located at corresponding corners of the cutting surface support platform, respectively. A plurality of spaced side walls are located subjacent to the cutting surface and attached to oppositely facing ones of the support arms and the support legs, respectively. A plurality of anchor brackets are attached to laterally opposing faces of the side walls, respectively.

In a non-limiting exemplary embodiment, the frame biasing mechanism includes a first stabilizing rail pivotally connected to a first one of the anchor brackets, a second stabilizing rail pivotally connected to a second one of the anchor brackets, and a pivot bracket coupled to the first and second stabilizing rails in such a manner that each of the first and second stabilizing rails is independently pivotal about a fulcrum axis passing through the pivot bracket when the frame is biased between the folded and unfolded positions.

In a non-limiting exemplary embodiment, each of the first and second stabilizing rails has axially opposed proximal and distal ends, respectively, wherein each of the proximal ends is coupled to the pivot bracket and each the distal ends is statically coupled to a corresponding one of the anchor brackets.

In a non-limiting exemplary embodiment, a longitudinal length of each of the first and second stabilizing rails is lengthened and shortened when the frame is biased to the unfolded and folded positions, respectively.

In a non-limiting exemplary embodiment, the first and second stabilizing rails are co-planar when the frame is biased to the folded position. In addition, the knife-holding implements face inwardly towards the pivot bracket when the frame is biased to the folded position.

In a non-limiting exemplary embodiment, the first and second stabilizing rails and the support legs are registered orthogonal to the side walls and the support arms when the frame is biased to the folded position, respectively.

In a non-limiting exemplary embodiment, the disclosure further includes a method of utilizing a portable cutting table for supporting foodstuff during cutting operations. Such a method preferably includes the chronological steps of: providing a free-standing frame capable of being transported between remote locations; providing and attaching a cutting surface support platform to a top of the frame; providing and connecting a cutting surface to the cutting surface support platform; providing a mechanism for selectively biasing the frame between folded and unfolded positions while the cutting surface remains statically engaged with the cutting surface support platform; providing and fixedly mating a plurality of knife-holding implements directly to the frame; and biasing the frame between the folded and unfolded positions, thereby causing the knife-holding implements to simultaneously articulate about a fulcrum axis as well as automatically displace between stored and exposed positions, respectively.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE SEVERAL VIEWS OF THE DRAWING

The novel features believed to be characteristic of this disclosure are set forth with particularity in the appended claims. The disclosure itself, however, both as to its organization and method of operation, together with further objects and advantages thereof, may best be understood by reference to the following description taken in connection with the accompanying drawings in which:

FIG. 5 is a perspective view showing the frame biasing mechanism at a partially extended position;

FIG. 6 is an exploded view the frame biasing mechanism shown in FIG. 5;

FIG. 9 is a top plan view of a cutting surface support platform employed by the cutting table, in accordance with an exemplary embodiment of the present disclosure;

FIG. 9a is a side elevational view showing a bushing located at one end of a side wall of the cutting surface support platform shown in FIG. 9, in accordance with an exemplary embodiment of the present disclosure;

FIG. 9b is an enlarged, partial side elevational view of the bushing shown in FIG. 9a, in accordance with an exemplary embodiment of the present disclosure;

FIG. 9c is an enlarged, cross-sectional view taken along line 9c-9c in FIG. 9, in accordance with an exemplary embodiment of the present disclosure;

FIG. 9d is an enlarged, partial top plane view of a corner of the cutting surface support platform shown in FIG. 9, wherein each corner is cut welded at approximately a 45 degree angle, in accordance with an exemplary embodiment of the present disclosure;

FIG. 11 is a partial, top plan view showing a support leg welded to an interior perimeter of the cutting surface support platform, in accordance with an exemplary embodiment of the present disclosure; and FIG. 11a is a partial view of a support leg extension employing a detent (locking member) for extending and retracting a longitudinal length of the support leg, in accordance with an exemplary embodiment of the present disclosure.

Figure 2:
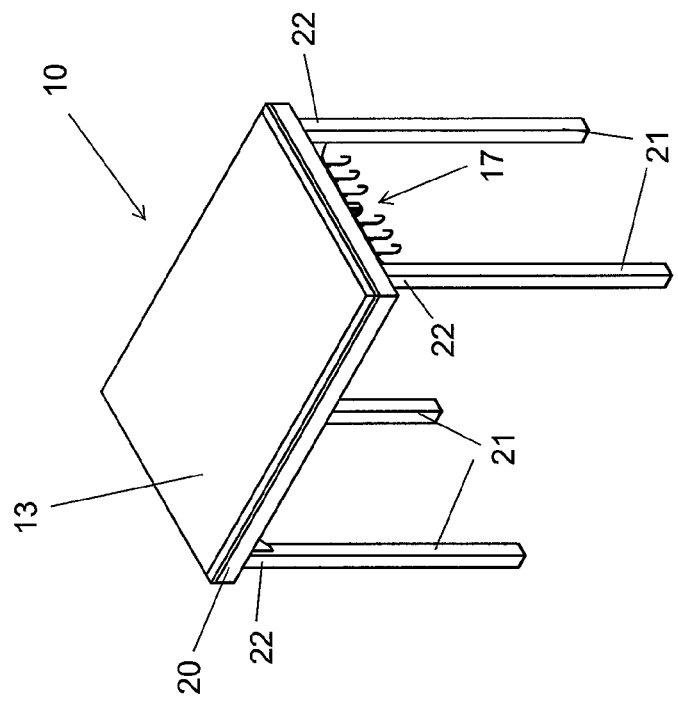
FIG. 2 is perspective view of showing the free-standing, portable cutting table at an unfolded position.
Figure 1:
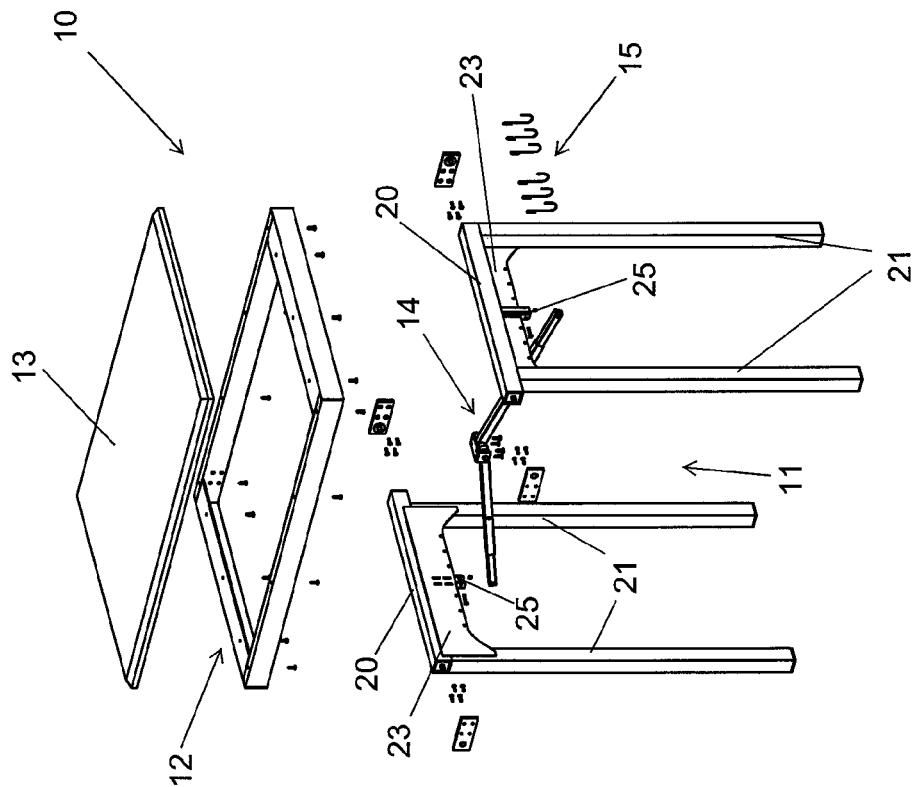
FIG. 1 is an exploded view showing a free-standing, portable cutting table, in accordance with an exemplary embodiment of the present disclosure.
Figure 3:
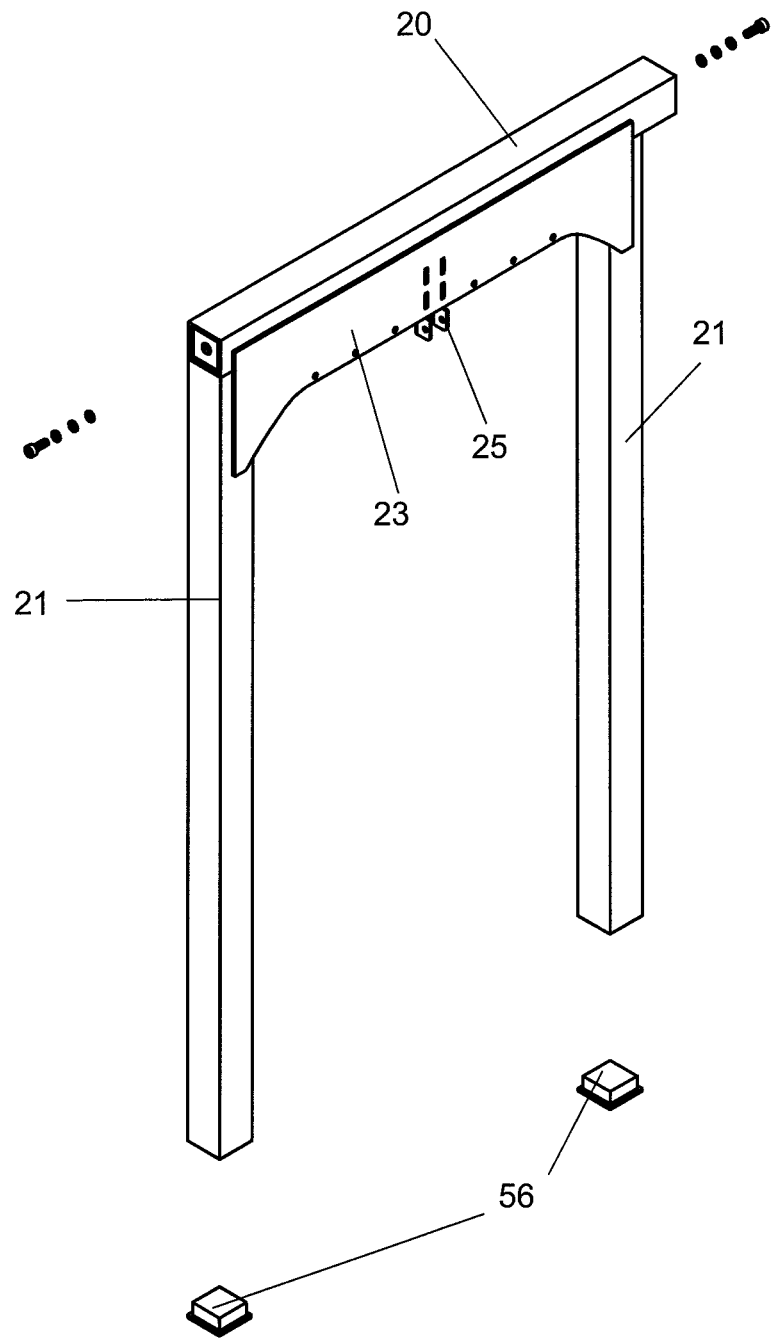
FIG. 3 is a perspective view showing one side of the frame including a pair of support legs, a support arm, a side wall and an anchor bracket attached to the side wall.
Figure 4:
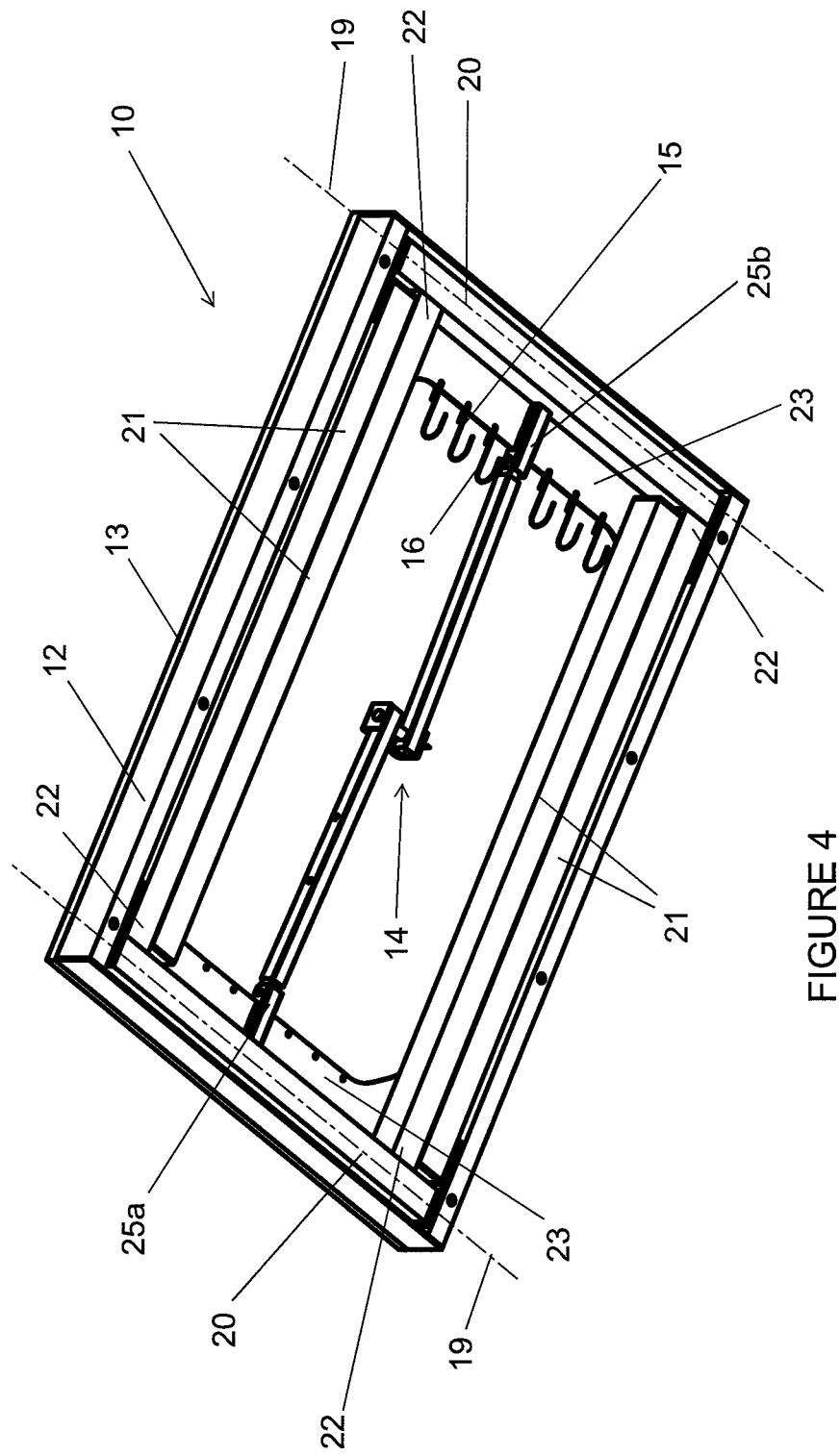
FIG. 4 is a perspective view showing an underside of the free-standing, portable cutting table at a folded position.

Those skilled in the art will appreciate that the figures are not intended to be drawn to any particular scale; nor are the figures intended to illustrate every embodiment of the disclosure. The disclosure is not limited to the exemplary embodiments depicted in the figures or the shapes, relative sizes or proportions shown in the figures.

DETAILED DESCRIPTION OF THE DISCLOSURE

The present disclosure will now be described more fully hereinafter with reference to the accompanying drawings, in which a preferred embodiment of the disclosure is shown. This disclosure may, however, be embodied in many different forms and should not be construed as limited to the embodiment set forth herein. Rather, this embodiment is provided so that this application will be thorough and complete, and will fully convey the true scope of the disclosure to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The apparatus of this disclosure is referred to generally in FIGS. 1-11a by reference numeral 10 and is intended to provide a portable cutting table 10 for supporting foodstuff during cutting operations. It should be understood that the portable cutting table 10 may be used to support many different types of items and should not be limited to supporting only foodstuff.

Referring initially to FIGS. 1-6, the portable cutting table 10 includes a free-standing frame 11 capable of being transported between remote locations wherein the frame 11 is biased between folded and unfolded positions, respectively. A cutting surface support platform 12 is attached to a top of the frame 11 and a cutting surface 13 is removably connected to the cutting surface support platform 12. The portable cutting table 10 further includes a mechanism 14 (frame biasing means) for selectively biasing the frame 11 between the folded and unfolded positions while the cutting surface 13 remains statically engaged with the cutting surface support platform 12. A plurality of knife-holding implements 15 are directly and fixedly mated to the frame 11 in such a manner that the knife-holding implements 15 are simultaneously articulated about a corresponding fulcrum axis 19 and thereby automatically displaced between stored and exposed positions 16, 17 as the frame 11 is biased between the folded and unfolded positions, respectively. The combination of such claimed elements provides an unpredictable and unexpected benefit of quickly and efficiently folding/unfolding the frame and thereby automatically stored/exposing the knife-holding implements without requiring extra steps, which solves the problem of having to manually and independently fold/bias the frame and knife-holding implements.

In a non-limiting exemplary embodiment, the cutting surface support platform 12 is intercalated between the frame 11 and the cutting surface 13.

In a non-limiting exemplary embodiment, the frame 11 includes a plurality of rectilinear support arms 20 attached to the cutting surface support platform 12 and registered parallel to the cutting surface 13 when the frame 11 is at the folded and unfolded positions. A plurality of rectilinear support legs 21 are provided wherein each support leg 21 has top ends 22 situated subjacent to the cutting surface support platform 12. In this manner, the top ends 22 are coupled to corresponding ones of the support arms 20 and located at corresponding corners of the cutting surface support platform 12, respectively. A plurality of spaced side walls 23 are located subjacent to the cutting surface 13 and attached to oppositely facing ones of support arms 20 and support legs 21, respectively. A plurality of anchor brackets 25 are attached to laterally opposing faces of side walls 23, respectively. Optionally, pegs 56 may be attached to the bottom of the support legs 21, for gripping a support surface. The combination of such claimed elements provides an unpredictable and unexpected benefit of ensuring the frame 12 is sturdy and able to receive alternate ones of the cutting surfaces 13, which solves the problem of having to use the same type of cutting surface 13 for various applications.

In a non-limiting exemplary embodiment, the frame biasing mechanism 14 includes a first stabilizing rail 26 pivotally connected to a first one 25a of anchor brackets 25. A second stabilizing rail 28 is pivotally connected to a second one 25b of anchor brackets 25. A pivot bracket 30 is coupled to first and second stabilizing rails 26, 28 in such a manner that each of the first and second stabilizing rails 26, 28 is independently pivotal about a fulcrum axis 70 passing through the pivot bracket 30 when the frame 11 is biased between the folded and unfolded positions. The combination of such claimed elements provides an unpredictable and unexpected benefit of ensuring the frame 12 is easily folded/unfolded as well as stabilized at each position.

In a non-limiting exemplary embodiment, each of the first and second stabilizing rails 26, 28 has axially opposed proximal and distal ends 32, 33, respectively, wherein each of proximal end 32 is coupled to the pivot bracket 30 via a pin 50 and spacer 51. Each distal end 33 is statically coupled to a corresponding one 25a, 25b of anchor brackets 25. The combination of such claimed elements provides an unpredictable and unexpected benefit of independently pivoting each stabilizing rail 26, 28 as each side of the frame 12 is folded/unfolded.

In a non-limiting exemplary embodiment, detents 53 are used to lock the longitudinal lengths after the frame is biased to the folded and unfolded positions. During folding/unfolding motions, detents 53 are disengaged from the first and second stabilizing rails 26, 28 to allow lengthening/shortening thereof. In this manner, a longitudinal length of each of the first and second stabilizing rails 26, 28 is lengthened and shortened when the frame 11 is biased to the unfolded and folded positions, respectively. The combination of such claimed elements provides an unpredictable and unexpected benefit of permitting smooth rotating motion about pivot axis 70 during folding/unfolding procedures.

In a non-limiting exemplary embodiment, the first and second stabilizing rails 26, 28 are co-planar when the frame 11 is biased to the folded position. In addition, the knife-holding implements 15 face inwardly towards the pivot bracket 30 when the frame 11 is biased to the folded position. The combination of such claimed elements provides an unpredictable and unexpected benefit of ensuring the knife-holding implements 15 do not stick out after the frame 12 is folded, which solves the problem of having unsafe protruding sections extending outwardly from the frame 12.

In a non-limiting exemplary embodiment, the first and second stabilizing rails 26, 28 and support legs 21 are registered orthogonal to the side walls 23 and the support arms 20 when the frame 11 is biased to the folded position, respectively. The combination of such claimed elements provides an unpredictable and unexpected benefit of ensuring each stabilizing rail 26, 28 and support leg 21 lays along a substantially uniform plane while the frame 12 is folded.

Figure 8:
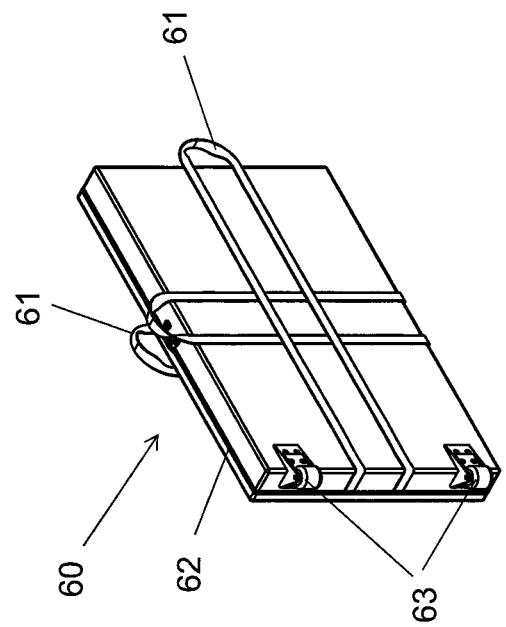
FIG. 8 is another perspective view of the carrying case shown in FIG. 7, wherein a plurality of straps/support members are crisscrossed along an outer surface of the carrying case.
Figure 7:
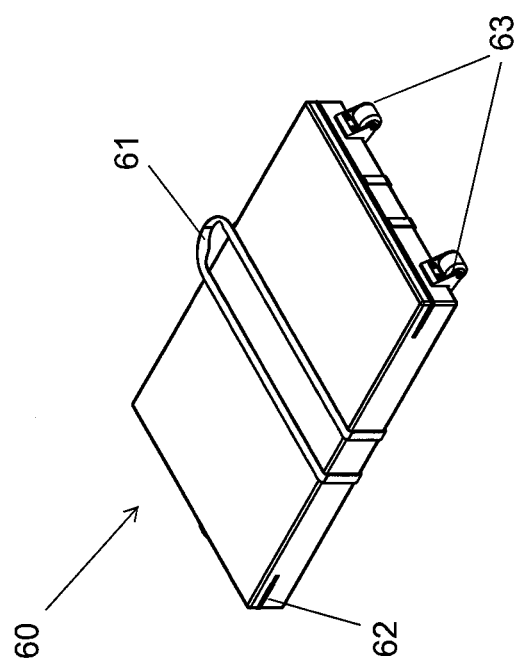
FIG. 7 is a perspective view showing a carrying case for housing and transporting the folded cutting table, in accordance with an exemplary embodiment of the present disclosure.
Figure 10A:
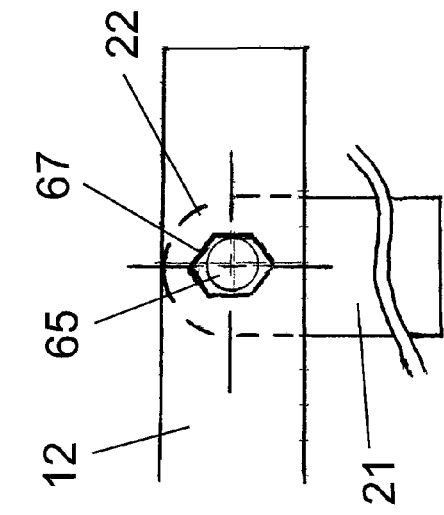
FIG. 10a is an enlarged, partial view showing the pivotal bushing attachment between the top end of the support leg and the cutting surface support platform, in accordance with an exemplary embodiment of the present disclosure.
Figure 10:
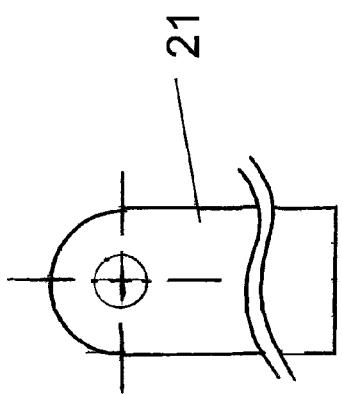
FIG. 10 is an enlarged, partial view of support leg having an aperture receiving the bushing shown in FIG. 9b, in accordance with an exemplary embodiment of the present disclosure.
Figure 10B:
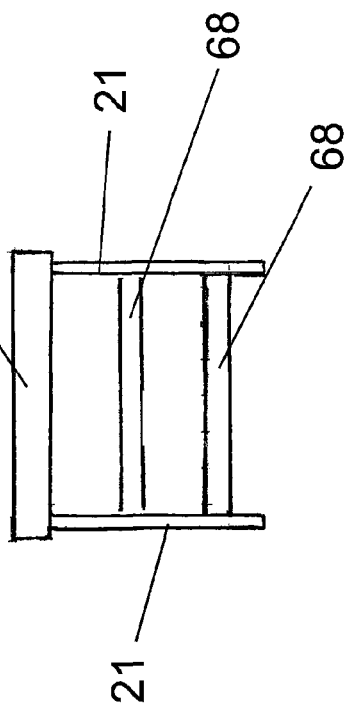
FIG. 10b is a side elevational view showing a plurality of cross-members attached to the support legs, in accordance with an exemplary embodiment of the present disclosure.

Referring to FIGS. 7-8, in a non-limiting exemplary embodiment, a carrying case 60 may be provided for housing and transporting the folded cutting table 10. Such a carrying case 60 has a plurality of straps/support members 61 crisscrossed along an outer surface of the carrying case 60. Wheels/casters 63 may be rotatably coupled to the carrying case 60 for rolling the housed cutting table 10 during transport. A zipper 62 or other suitable fastener extends along at least a partial perimeter of the carrying case 60 for easy access to an interior thereof.

Referring to FIGS. 9-11a, in a non-limiting exemplary embodiment, each corner 66 of the cutting surface support platform 12 may be cut welded at approximately a 45 degree angle. A bushing 65 may be located at one end of each longitudinal side wall of the cutting surface support platform 12. Each support leg 21 may have an aperture formed therein for receiving bushing 65. A bolt 67 pivotally fastens the bushing 65 to the support leg 21 and cutting surface support platform 12. In this manner, a pivotal bushing attachment is created between top end 22 of each support leg 21 and corners 66 of the cutting surface support platform 12.

In a non-limiting exemplary embodiment, the cutting table 10 may not be collapsible between the folded and unfolded positions. That is, frame 11 may include a plurality of cross-members 68 attached to the support legs 21 for additional stability. Such support legs 21 may be welded to an interior perimeter of the cutting surface support platform 12. Of course, each support leg 21 may have a support leg extension employing a detent 69 (locking member) for extending and retracting a longitudinal length of the support leg 21.

In a non-limiting exemplary embodiment, the disclosure further includes a method of utilizing a portable cutting table 10 for supporting foodstuff during cutting operations. Such a method preferably includes the chronological steps of: providing a free-standing, portable and collapsible frame 11 capable of being transported between remote locations; providing and attaching a cutting surface support platform 12 to a top of the frame 11; providing and connecting a cutting surface 13 to the cutting surface support platform 12; providing a mechanism 14 (frame biasing means) for selectively biasing the frame 11 between folded and unfolded positions while the cutting surface 13 remains statically engaged with the cutting surface support platform 12; providing and fixedly mating a plurality of knife-holding implements 15 directly to the frame 11; and biasing the frame 11 between the folded and unfolded positions, thereby causing the knife-holding implements 15 to simultaneously articulate about a corresponding fulcrum axis 16 as well as automatically displace between stored and exposed positions 16, 17, respectively.

While the disclosure has been described with respect to a certain specific embodiment, it will be appreciated that many modifications and changes may be made by those skilled in the art without departing from the spirit of the disclosure. It is intended, therefore, by the appended claims to cover all such modifications and changes as fall within the true spirit and scope of the disclosure. In particular, with respect to the above description, it is to be realized that the optimum dimensional relationships for the parts of the present disclosure may include variations in size, materials, shape, form, function and manner of operation.

What is claimed as new and what is desired to secure by Letters Patent of the United States is:

1. A portable cutting table for supporting foodstuff during cutting operations, said portable cutting table comprising:
   a frame capable of being transported between remote locations, said frame being biased between folded and unfolded positions respectively;
   a cutting surface support platform attached to a top of said frame;
   a cutting surface connected to said cutting surface support platform;
   means for selectively biasing said frame between the folded and unfolded positions while said cutting surface remains statically engaged with said cutting surface support platform; and
   a plurality of knife-holding implements directly and fixedly mated to said frame in such a manner that said knife-holding implements are simultaneously articulated about a fulcrum axis and thereby automatically displaced between stored and exposed positions as said frame is biased between the folded and unfolded positions, respectively;
   wherein said frame comprises:
   a plurality of rectilinear support arms attached to said cutting surface support platform and registered parallel to said cutting surface when said frame is at the folded and unfolded positions;
   a plurality of rectilinear support legs each having top ends situated subjacent to said cutting surface support platform, said top ends being coupled to corresponding ones of said support arms and located at corresponding corners of said cutting surface support platform, respectively;
   a plurality of spaced side walls located subjacent to said cutting surface and attached to oppositely facing ones of said support arms and said support legs, respectively; and
   a plurality of anchor brackets attached to laterally opposing faces of said side walls, respectively.

2. The portable cutting table of claim 1, wherein said cutting surface support platform is intercalated between said frame and said cutting surface.

3. The portable cutting table of claim 1, wherein said frame biasing means comprises:
   a first stabilizing rail pivotally connected to a first one of said anchor brackets;
   a second stabilizing rail pivotally connected to a second one of said anchor brackets; and
   a pivot bracket coupled to said first and second stabilizing rails in such a manner that each of said first and second stabilizing rails is independently pivotal about a fulcrum axis passing through said pivot bracket when said frame is biased between the folded and unfolded positions.

4. The portable cutting table of claim 3, wherein each of said first and second stabilizing rails has axially opposed proximal and distal ends, respectively, wherein each said proximal ends is coupled to said pivot bracket and each said distal ends is statically coupled to a corresponding one of said anchor brackets.

5. The portable cutting table of claim 3, wherein a longitudinal length of each of said first and second stabilizing rails is lengthened and shortened when said frame is biased to the unfolded and folded positions, respectively.

6. The portable cutting table of claim 3, wherein said first and second stabilizing rails are co-planar when said frame is biased to the folded position, wherein said knife-holding implements face inwardly towards said pivot bracket when said frame is biased to the folded position.

7. The portable cutting table of claim 3, wherein said first and second stabilizing rails and said support legs are registered orthogonal to said side walls and said support arms when said frame is biased to the folded position, respectively.

8. A portable cutting table for supporting foodstuff during cutting operations, said portable cutting table comprising:
   a free-standing frame capable of being transported between remote locations, said frame being biased between folded and unfolded positions respectively;
   a cutting surface support platform attached to a top of said frame;
   a cutting surface connected to said cutting surface support platform;
   means for selectively biasing said frame between the folded and unfolded positions while said cutting surface remains statically engaged with said cutting surface support platform; and
   a plurality of knife-holding implements directly and fixedly mated to said frame in such a manner that said knife-holding implements are simultaneously articulated about a fulcrum axis and thereby automatically displaced between stored and exposed positions as said frame is biased between the folded and unfolded positions, respectively;
   wherein said frame comprises:
   a plurality of rectilinear support arms attached to said cutting surface support platform and registered parallel to said cutting surface when said frame is at the folded and unfolded positions;
   a plurality of rectilinear support legs each having top ends situated subjacent to said cutting surface support platform, said top ends being coupled to corresponding ones of said support arms and located at corresponding corners of said cutting surface support platform, respectively;
   a plurality of spaced side walls located subjacent to said cutting surface and attached to oppositely facing ones of said support arms and said support legs, respectively; and
   a plurality of anchor brackets attached to laterally opposing faces of said side walls, respectively.

9. The portable cutting table of claim 8, wherein said cutting surface support platform is intercalated between said frame and said cutting surface.

10. The portable cutting table of claim 8, wherein said frame biasing means comprises:
    a first stabilizing rail pivotally connected to a first one of said anchor brackets;
    a second stabilizing rail pivotally connected to a second one of said anchor brackets; and
    a pivot bracket coupled to said first and second stabilizing rails in such a manner that each of said first and second stabilizing rails is independently pivotal about a fulcrum axis passing through said pivot bracket when said frame is biased between the folded and unfolded positions.

11. The portable cutting table of claim 10, wherein each of said first and second stabilizing rails has axially opposed proximal and distal ends, respectively, wherein each said proximal ends is coupled to said pivot bracket and each said distal ends is statically coupled to a corresponding one of said anchor brackets.

12. The portable cutting table of claim 10, wherein a longitudinal length of each of said first and second stabilizing rails is lengthened and shortened when said frame is biased to the unfolded and folded positions, respectively.

13. The portable cutting table of claim 10, wherein said first and second stabilizing rails are co-planar when said frame is biased to the folded position, wherein said knife-holding implements face inwardly towards said pivot bracket when said frame is biased to the folded position.

14. The portable cutting table of claim 10, wherein said first and second stabilizing rails and said support legs are registered orthogonal to said side walls and said support arms when said frame is biased to the folded position, respectively.

* * * * *